UNITED STATES PATENT OFFICE.

CARL A. BLACK AND WILLIAM H. TEARE, OF CLEVELAND, OHIO, ASSIGNORS OF ONE-THIRD TO SAID BLACK AND TWO-THIRDS TO JOHN R. COWELL, OF TOLEDO, OHIO.

FERTILIZER AND PROCESS OF PRODUCING SAME.

1,140,437.  Specification of Letters Patent.  Patented May 25, 1915.

No Drawing. Original application filed May 9, 1914, Serial No. 823,573. Divided and this application filed July 24, 1914. Serial No. 852,865.

*To all whom it may concern:*

Be it known that we, CARL A. BLACK and WILLIAM H. TEARE, citizens of the United States, and residents of Cleveland, in the county of Cuyahoga and State of Ohio, have invented a certain new and useful Improvement in Fertilizers and Processes of Producing Same, of which the following is a full, clear, and exact description.

This invention relates to a fertilizer or fertilizer material (which may be mixed with other fertilizing ingredients to be ultimately used for enrichment of the soil), and to the method or process of producing the same,—this application being a division of our prior application which eventuated in Patent #1,121,324, dated December 15th, 1914, and entitled Fertilizer, and process of producing the same.

In our prior application above referred to we describe two varieties or species of a new fertilizer or fertilizer material, namely, the non-acidulated and the acidulated varieties which we discovered could be produced from loggerhead sponge (a natural product which is found in the sea in certain semi-tropical regions) when said sponge is suitably treated by the novel process constituting a part of our invention. The subject matter of the present application is the acidulated variety and the process by which it is produced.

Before describing the fertilizer and the process constituting the subject matter of this application, it may be well to briefly state herein some of the characteristics of loggerhead sponge in its natural state, and to briefly describe the non-acidulated fertilizer which we produced therefrom, and the manner in which the sponge is treated to produce the same, although for a complete understanding of the above reference is had to our prior application. Loggerhead sponge in its natural state decomposes very rapidly, giving off offensive odors, and has generally been regarded, prior to our invention, as very undesirable and, in many respects, detrimental to health and to the commercial sponge industry. To produce the non-acidulated variety, this loggerhead sponge is, after removal from the sea, dried and granulated, and, if necessary to forestall decomposition prior to the regular treatment, it is treated with suitable antiseptic chemicals. The sponge is then dried to a predetermined moisture content, preferably of not more than six per cent., and it is granulated preferably to a definite state of fineness,—that is to a definite admixture of fines and coarse. This fertilizer possesses an average composition which, on analysis, shows substantially the following results: organic matter 40% to 60%, nitrogen as ammonia, $NH_3$, 6% to 7%, calcium carbonate, $CaCO_3$, 4% to 6%, phosphate of calcium $Ca_3(PO_4)_2$ 1% to 2%, potash in organic combination, 1/2% to 1%, moisture 1/2% to 6%.

For the production of the acidulated variety we may use as a basis either non-acidulated variety, or, we may and preferably do use the raw sponge in its natural state, as it is unnecessary for the purpose of the acidulated variety either that it be first reduced or dried to a definite or particular moisture content, or be ground to a definite grade of fineness or admixture of fines and coarse. However, the sponge should be dried to the extent that it is apparently dry to the touch, and should be crushed or ground down to a fairly fine powder. The drying may be done by applying the heat directly to the sponge shortly after its removal from the sea, or, if the wet sponge be given a preliminary treatment of suitable antiseptic chemical, such as sulfurous acid gas or the gas produced from burning sulfur or sulfids, so as to forestall premature decomposition, it may then be sun dried in suitable racks or receptacles. To then convert the dried and ground sponge to the acidulated fertilizer, it is thoroughly mixed with sulfuric acid in the proportion of approximately 90% dried sponge to approximately 10% sulfuric acid. This is preferably done in a lead or wooden chamber, either by allowing the acid to distribute itself through the mass of sponge, or the latter may be stirred, if desired, to hasten the action.

The principal object of this treatment is to break up the cellular structure of the sponge, converting it into a substance wherein the elements of plant nutrition can be readily dissolved by water, thus enabling the plant to immediately avail itself of such elements without waiting for the process of decay in the soil.

The action of the acid on the celludose is to abstract hydrogen and oxygen from the same, forming water, and setting free carbon. Inasmuch as the valuable plant foods or the elements of plant nutrition in the fertilizer, are surrounded, enveloped and intimately associated with this cellulose, it is a matter of considerable importance to get it out of the way. By the action of the acid on the nitrogenous organic matter, the same is converted to ammonium sulfate, $(NH_4)_2SO_4$ which is very soluble and is readily assimilated by the plant. Furthermore, by the action of the acid, the calcium carbonate is converted into calcium sulfate $CaSO_4$, the calcium phosphate is converted into the acid calcium phosphate $CaH_2(PO_4)_2$, and phosphoric acid $H_3PO_4$, the potassium in organic combination is converted to sulfate of potassium $K_2SO_4$, and the silicates are decomposed, producing products wherein the valuable elements are in a far more soluble condition than before the treatment.

In conclusion, therefore, and by way of summary, it may be stated that, although the non-acidulated variety is less expensive than the acidulated variety, the latter contains elements of plant nutrition which are more readily absorbed by the living plant than the former. Additionally, the acidulated variety, like the non-acidulated, can be shipped and stored without danger of decomposition or spontaneous combustion.

Having described our invention, what we claim is:

1. A fertilizer or fertilizer material, comprising loggerhead sponge treated with an acid capable of disintegrating cellulose.

2. A fertilizer or fertilizer material, comprising loggerhead sponge treated with sulfuric acid.

3. A fertilizer or fertilizer material, comprising loggerhead sponge dried and treated with an acid capable of disintegrating cellulose.

4. A fertilizer or fertilizer material, comprising loggerhead sponge granulated and treated with an acid capable of disintegrating cellulose.

5. A fertilizer or fertilizer material, comprising loggerhead sponge dried, granulated and treated with an acid capable of disintegrating cellulose.

6. A fertilizer or fertilizer material, comprising dried and ground loggerhead sponge, mixed with sulfuric acid in the proportion of substantially 90 per cent. sponge to substantially 10 per cent. acid.

7. The process of producing a fertilizer or fertilizer material from loggerhead sponge, which comprises treating the sponge with an acid capable of disintegrating cellulose.

8. The process of producing a fertilizer or fertilizer material from loggerhead sponge, which comprises drying the sponge and treating the same with an acid capable of disintegrating cellulose.

9. The process of producing a fertilizer or fertilizer material, which comprises granulating loggerhead sponge and treating the same with an acid capable of disintegrating cellulose.

10. The process of producing a fertilizer or fertilizer material, which comprises granulating loggerhead sponge and treating the same with sulfuric acid.

11. The process of producing a fertilizer or fertilizer material, which comprises drying and grinding loggerhead sponge and treating the dried and ground product with an acid capable of disintegrating cellulose.

12. The process of producing a fertilizer or fertilizer material, which comprises drying and grinding loggerhead sponge and mixing the dried and ground product with sulfuric acid.

13. The process of producing a commercial fertilizer from loggerhead sponge which comprises treating the sponge with sulfuric acid.

14. The process of producing a fertilizer or fertilizer material, which comprises treating loggerhead sponge so as to convert nitrogenous matter contained therein to ammonium sulfate.

15. The process of producing a fertilizer or fertilizer material, which comprises treating loggerhead sponge so as to convert calcium phosphate contained therein to acid calcium phosphate.

16. The process of producing a fertilizer or fertilizer material, which comprises treating loggerhead sponge so as to convert potassium contained therein in organic combination to sulfate of potassium.

In testimony whereof, we hereunto affix our signatures in the presence of two witnesses.

CARL A. BLACK.
WILLIAM H. TEARE.

Witnesses:
A. F. Kwis,
L. I. Porter.

Copies of this patent may be obtained for five cents each, by addressing the "Commissioner of Patents, Washington, D. C."